J. L. JACKSON.
INDICATOR FOR PNEUMATIC TIRES.
APPLICATION FILED MAR. 20, 1919.
1,311,898.
Patented Aug. 5, 1919.
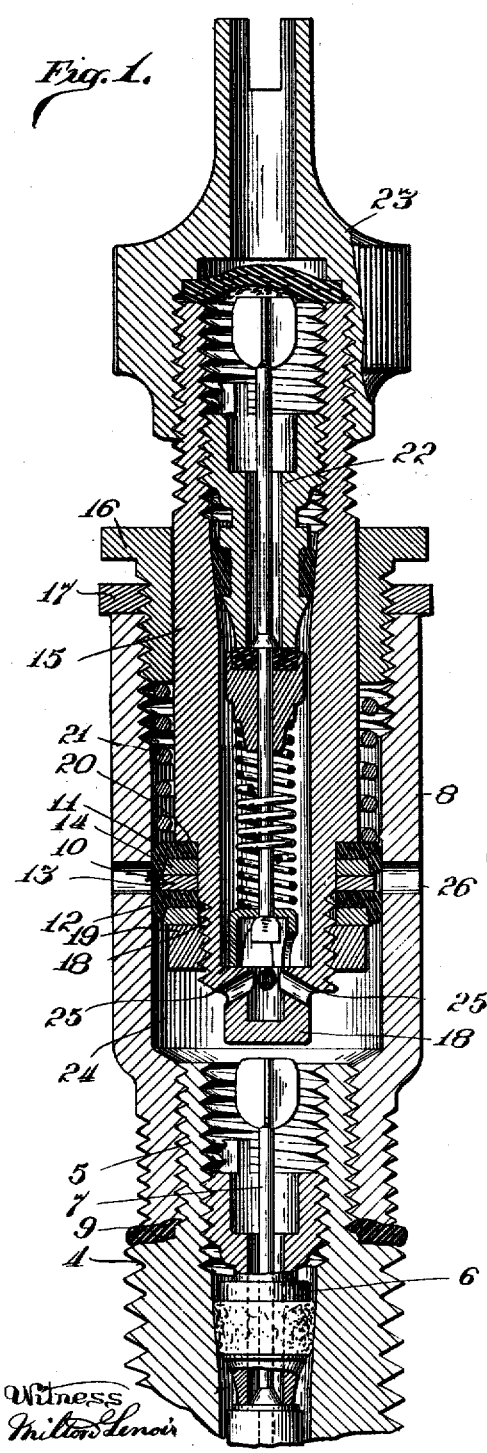
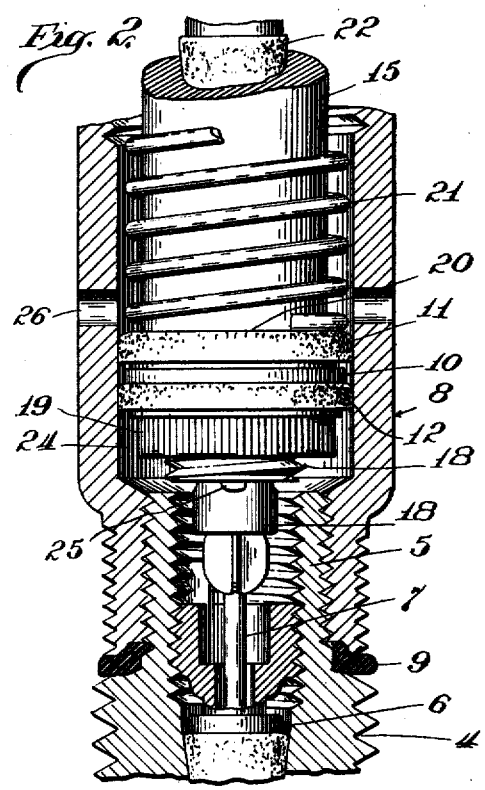
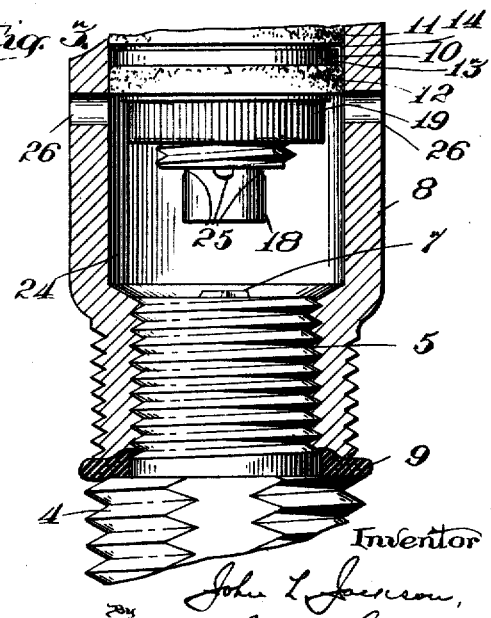

UNITED STATES PATENT OFFICE.

JOHN L. JACKSON, OF RIVER FOREST, ILLINOIS.

INDICATOR FOR PNEUMATIC TIRES.

1,311,898.  Specification of Letters Patent.  Patented Aug. 5, 1919.

Application filed March 20, 1919. Serial No. 283,823.

*To all whom it may concern:*

Be it known that I, JOHN L. JACKSON, a citizen of the United States, and a resident of River Forest, in the county of Cook and State of Illinois, have invented certain new and useful Improvements in Indicators for Pneumatic Tires, of which the following is a specification, reference being had to the accompanying drawings.

It has long been known that a pneumatic tire will wear much longer without breaking down if it is always kept pumped up to or near the pressure which it is designed to carry, and many tire manufacturing concerns make a practice of urging users of their tires to exercise constant watchfulness so that they will not use under inflated tires, as by doing so the tires break down much more quickly, and the proper mileage can not be obtained from them. Notwithstanding that the desirability of proper inflation has been well understood, probably the great majority of users neglect their tires and do not keep them properly inflated, owing to the fact that it is not practicable to determine by looking at a tire whether or not its pressure has fallen below a point where further inflation is needed, unless, of course, the tire is comparatively flat. For example, a tire which is designed to carry a pressure of ninety pounds will stand up quite well under a pressure of sixty pounds, or even less, and the only safe way to find out whether or not the pressure is too low is to make use of a pressure gage. This, however, involves some work, as the usual valve stem cap must be removed, and also the smaller cap commonly used to close the upper end of the valve stem, and, therefore, unless the tire is deflated to such an extent as to be at once apparent to the eye, it is very apt to be used under insufficient pressure, with consequent damage to the fabric.

So far as I am aware, no one has heretofore provided a satisfactory device adapted to be applied to a tire and to remain so applied when the tire is in use, which will indicate at all times whether or not the tire carries sufficient pressure so that it may be safely used, thereby enabling the user of the car to ascertain by mere casual inspection, and without removing any parts, whether or not the tire should be further inflated, and to provide such an indicator is the primary object of my invention. Other objects are to provide means whereby the vehicle tire may be inflated without removing the indicator; to provide means for adjusting the indicator to vary the critical pressure at which the indicator is operated, and to provide means for preventing inflation of the tire beyond a predetermined maximum. I accomplish my objects as illustrated in the drawings and as hereinafter described. What I regard as new is set forth in the claims.

In the accompanying drawings,—

Figure 1 is a vertical sectional view showing my improved indicator applied to the valve stem of a tire, the parts being in the position they occupy when the tire is inflated to a pressure above the critical point and the pressure does not exceed a predetermined maximum;

Fig. 2 is a similar view showing the position of the parts when the air pressure which actuates the indicator is below the critical point; and Fig. 3 is a fragmentary view showing the position of the indicator piston head when the air pressure exceeds the predetermined maximum.

Referring to the drawings,—4 indicates the usual valve stem of a pneumatic tire, the upper or outer end of which is provided, as usual, with a reduced nipple 5. 6 indicates the usual inside valve of the Schrader type which screws into the valve stem 4, and 7 indicates the plunger stem of such inside valve. As is well understood by those familiar with pneumatic tires such inside valve may be opened to permit air to pass through it by depressing the plunger stem 7.

8 indicates a cylindrical member which is adapted to screw or be otherwise secured upon the nipple 5, so as to make an airtight connection therewith, a rubber gasket 9 being preferably provided between the lower margin of said cylinder and the valve stem 4, for that purpose. 10 indicates a piston head fitted in the cylinder 8 and adapted to reciprocate therein. Said piston may be of any construction suitable to prevent leakage of air around the piston. In the drawings I have shown it as comprising cup washers 11—12 of leather or other suitable material spaced apart by metal disks 13—14, but any other suitable construction may be employed. 15 indicates a tubular plunger which is fitted in the cylinder 8 to reciprocate therein. As illustrated, said plunger is fitted to slide in a bushing 16 screwed into the upper end of the cylinder 8 around the upper portion of the plunger and secured by a locking collar or nut 17 adapted to engage the upper end of the cylinder 8. The lower portion of the plunger 15 is reduced in diameter to form a stem 18 upon which the piston 10 is mounted, the piston being held tightly in position upon said stem by a collar 19 screwed upon the stem 18 below the piston. Thus the piston is tightly clamped between the collar 19 and the shoulder 20 formed at the base of the stem 18. 21 indicates a spring fitted around the plunger 15 between the inner end of the bushing 16 and the piston 10. Obviously, by adjusting the bushing 16 the tension of the spring 21 may be varied. 22 indicates an inside valve similar to the inside valve 6 which is fitted in the upper end of the plunger 15. The internal diameter of said plunger is the same as that of the valve stem 4 so that standard inside valves may be used in both places. The upper end of the plunger 15 is externally screw-threaded to receive the usual connection of an air pump and also to receive the usual dust cap 23. 24 indicates a chamber between the piston 10 and the inside valve 6. 25 indicates one or more openings in the lower end of the plunger stem 18 through which communication is maintained between the inside of the plunger 15 and the chamber 24. 26 indicates one or more openings through the lower portion of the cylinder 8 arranged so that when the piston 10 is forced outward by excessive pressure in the chamber 24 the air in said chamber may escape to the atmosphere. It will be noted that the lower end of the stem 18 projects below the piston 10 and overlies the stem 7 of the inside valve 6. The arrangement is such that when the piston 10 moves down far enough the lower end of the stem 18 will engage the plunger 7 and move it inwardly, thereby opening the valve 6.

The operation of the device is as follows: When the cylinder 8 is first applied to the valve stem 4 there will be no air pressure in the chamber 24, and consequently the piston 10 will be moved down by the spring 21 until the stem 18 engages the stem 7, thereby opening the inside valve 6. The spring 21 is calibrated so that it will resist a predetermined pressure in the chamber 24 which constitutes the critical pressure of the device, say seventy pounds to the square inch. This critical pressure may, however, be varied by adjusting the bushing 16. The upper end of the plunger 15 may then be connected to a source of supply of compressed air, whereupon the air entering through valve 22 will pass into chamber 24 and thence through valve 6 into the tire. The pressure in the tire will be substantially the same as that in the chamber 24 and consequently the piston 10 and plunger 15 will remain in their retracted or innermost position until the pressure in the chamber 24 reaches the critical point. The position of the parts before this critical point is reached is shown in Fig. 2. When the critical point is reached or exceeded the piston 10 will be forced outward, moving the plunger 15 in the same direction until the parts assume the position shown in Fig. 1. This operation will release the valve stem 7, permitting it to close so as to prevent the escape of air from the tire, but the plunger 15 will remain in its projected position owing to the pressure in the chamber 24, and it will retain such position so long as the pressure in said chamber exceeds the critical point. If the pressure in the tire should fall below the critical point while the pressure in the chamber 24 still remains above the critical point air will flow from said chamber into the tire thus reducing the pressure in the chamber 24 and permitting the plunger 15 to descend, thereby indicating that the tire is under-inflated. If the pressure in the chamber 24 falls below the critical point while the tire pressure remains above the critical point the piston 14 will descend, thereby opening the valve 6 and admitting air from the tire to the chamber 24, bringing the pressure in said chamber up above the critical point so that the plunger 15 will be again projected. The position of the plunger 15, therefore, always indicates whether the tire pressure is above or below the critical point.

Pumping up of the tire to an excessive pressure is prevented because when the pressure in the chamber 24 exceeds the critical point the valve 6 is permitted to close by the upward movement of the piston 10, and if after the closure of the valve 6 the admission of air to the chamber 24 is continued the piston 10 will be moved upward beyond the position it occupies when the tire is properly inflated and will uncover the openings 26 so that said openings then communicate with the chamber 24 and permit air to escape until the pressure in said chamber is reduced to the safety point, whereupon the piston 10 will descend under the action of the spring 21 again covering said openings so that the pressure in the chamber 24 will be held at the proper point. If it be desired to deflate the tire without removing the indicator it is necessary only to open the upper inside valve 22 by depressing its plunger in the usual way. This releases the pressure in the chamber 24 whereupon the plunger 15 operates to open the inside valve 6 by depressing its plunger 7, permitting the air in the tire to escape.

My improved device, therefore, provides a reliable indicator which may readily be adapted for use with tires of different sizes designed to carry different pressures, and which not only operates to indicate whether or not the tire pressure is above or below the critical point, but also prevents over-inflation of the tire. Furthermore, the tire may be readily inflated or deflated without removing the indicator from the valve stem of the tire. It will be noted that my improved indicator is entirely automatic and does not have to be manipulated by hand after it is once placed in position on the valve stem of the tire.

While I have illustrated and described the preferred embodiment of my invention, inasmuch as I believe myself to be the first to provide a device operating in the manner and for the purpose described, I do not limit myself to such construction except in so far as it is claimed specifically, but include in my invention generically the subject-matter of the broader claims.

What I claim as my invention and desire to secure by Letters Patent, is:—

1. An indicator for pneumatic tires comprising a member adapted to be applied to the valve stem of a tire and to rotate with the tire when the same is in use, and means in said member normally operating to open the tire valve and actuated by tire pressure above a critical point to close the tire valve.

2. An indicator for pneumatic tires comprising a member adapted to be applied to the valve stem of a tire and to rotate with the tire when the same is in use, and spring operated means in said member normally operating to open the tire valve and actuated by tire pressure above a critical point to close the tire valve.

3. An indicator for pneumatic tires comprising a cylinder adapted to be applied to the valve stem of a tire and to rotate with the tire when the same is in use, a piston in said cylinder movable to open or close the tire valve to control the admission of air from the tire to said cylinder, said piston being actuated by tire pressure above a critical point to close the tire valve, and means for normally actuating said piston to open the tire valve when the air pressure in said cylinder is below a critical point.

4. An indicator for pneumatic tires comprising a member adapted to be applied to the valve stem of a tire and to rotate with the tire when the same is in use and forming an air tight chamber over the valve stem of the tire, and means operating to open the tire valve when the air pressure in said chamber is below a critical point, and to close said valve when the air pressure in said chamber is above such critical point.

5. An indicator for pneumatic tires comprising a member adapted to be applied to the valve stem of a tire and to rotate with the tire when the same is in use and forming an air tight chamber over the valve stem of the tire, and a piston in said chamber operating to open the tire valve when the air pressure in said chamber is below a critical point, and to close said valve when the air pressure in said chamber is above such critical point.

6. An indicator for pneumatic tires, comprising a member adapted to be applied to the valve stem of a tire and to rotate with the tire when the same is in use, and having an element normally operating to admit air from the tire to said member when said member is applied to the valve stem, and actuated by pressure in the tire above a critical point to cut off the admission of air until the pressure of the air in said member falls below such critical point.

7. An indicator for pneumatic tires, comprising a member adapted to be applied to the valve stem of a tire and to rotate with the tire when the same is in use, and having a movable element yieldingly held in position to admit air from the tire to said member when said member is applied to the valve stem, and actuated by pressure in the tire above a critical point to cut off the admission of air until the pressure of the air in said member falls below such critical point.

8. An indicator for pneumatic tires, comprising a member adapted to be applied to the valve stem of a tire and to rotate with the tire when the same is in use, and having a movable element yieldingly held in position to admit air from the tire to said member when said member is applied to the valve stem, and actuated by pressure in the tire above a critical point to cut off the admission of air until the pressure of the air in said member falls below such critical point, and a spring for actuating said movable element in opposition to the air pressure in said member.

9. An indicator for pneumatic tires, comprising a member adapted to be applied to the valve stem of a tire and to rotate with the tire when the same is in use, and having a piston movable into position to admit air from the tire to said member when said member is applied to the valve stem, a spring for so moving said piston, said piston being arranged to be actuated by pressure in the tire above a critical point to cut off the admission of air until the pressure of the air in said member falls below such critical point.

10. An indicator for pneumatic tires equipped with a valve stem provided with an inside valve, comprising a cylinder adapted to be applied to the valve stem and to rotate with the tire, controlling means in said cylinder operating to open the valve in the valve stem to admit air from the tire to said cylinder when the pressure in said cylinder falls below a critical point and arranged to be actuated by pressure in the tire above a critical point to close said valve and cut off the admission of air to said cylinder.

11. An indicator for pneumatic tires equipped with a valve stem provided with an inside valve, comprising a cylinder adapted to be applied to the valve stem and to rotate with the tire, a piston in said cylinder having means for opening the valve in the valve stem to admit air from the tire to said cylinder, and arranged to be actuated by pressure in the tire above a critical point to release said valve and cut off the admission of air to said cylinder, and means for actuating said piston to open said valve when the pressure in said cylinder falls below a critical point.

12. The combination with the valve stem of a pneumatic tire, of an inside valve provided with a plunger, of a cylinder adapted to be applied to the valve stem and to rotate with the tire when the same is in use, and means in said cylinder operating to move said plunger to open said valve when the tire pressure falls below a critical point and actuated to release said plunger by air from the tire when the tire pressure is above such critical point.

13. The combination with the valve stem of a pneumatic tire, and an inside valve provided with a plunger, of a cylinder adapted to be applied to the valve stem and to rotate with the tire when the same is in use, and means in said cylinder operating to admit air from the tire to said cylinder when the same is applied to the valve stem, and actuated by pressure in the tire above a critical point to cut off the admission of air to said cylinder until the pressure of the air therein falls below such critical point.

14. An indicator for pneumatic tires comprising a member adapted to be applied to the valve stem of a tire and to rotate with the tire when the same is in use, means in said member normally operating to open the tire valve and actuated by tire pressure above a critical point to close the tire valve, and means for varying the critical point at which said means operates.

15. An indicator for pneumatic tires comprising a member adapted to be applied to the valve stem of a tire and to rotate with the tire when the same is in use, means in said member normally operating to open the tire valve and actuated by tire pressure above a critical point to close the tire valve, and means whereby the tire may be inflated through said member.

16. An indicator for pneumatic tires comprising a member adapted to be applied to the valve stem of a tire and to rotate with the tire when the same is in use, means in said member normally operating to open the tire valve and actuated by tire pressure above a critical point to close the tire valve, means whereby the tire may be inflated through said member, and means for preventing over-inflation of the tire.

17. An indicator for pneumatic tires comprising a cylinder adapted to be applied to the valve stem of a tire and to rotate with the tire when the same is in use, a piston in said cylinder movable to open or close the tire valve to control the admission of air from the tire to said cylinder, said piston being actuated by tire pressure above a critical point to close the tire valve, and operating to open the tire valve when the air pressure in said cylinder is below a critical point, and means whereby the tire may be inflated through said cylinder.

18. An indicator for pneumatic tires comprising a member forming an air chamber over the valve stem of the tire, means in said member operating to open the tire valve when the air pressure in said chamber is below a critical point and to close said valve when the air pressure in said chamber is above the critical point, and means whereby the tire may be inflated through said chamber.

19. An indicator for pneumatic tires comprising a member forming an air chamber over the valve stem of the tire, means in said member operating to open the tire valve when the air pressure in said chamber is below a critical point and to close said valve when the air pressure in said chamber is above the critical point, means whereby the tire may be inflated through said chamber, and means for preventing excessive pressure in said chamber.

20. An indicator for pneumatic tires comprising a cylinder coöperating with the valve stem of the tire to form an air chamber, an externally projecting tubular plunger operating in said cylinder to open the tire valve when the pressure in said chamber is below a critical point and to close said valve when the pressure in said chamber is above the critical point, and a valve in said plunger, whereby the tire may be inflated therethrough.

21. The combination with the valve stem of an pneumatic tire and a valve therein, of means forming an air chamber above said valve, a member in said chamber operating to open said valve when the pressure in said chamber is below a critical point and to close said valve when the pressure in said chamber is above the critical point, and an externally opening valve controlled duct communicating with said chamber.

JOHN L. JACKSON.